United States Patent [19]

Flüehmann

[11] 4,200,000
[45] Apr. 29, 1980

[54] GEAR TRAIN

[75] Inventor: Werner Flüehmann, Hessigkofen, Switzerland

[73] Assignee: Societe Suisse pour l'Industrie Horlogere Management Services S.A., Switzerland

[21] Appl. No.: 948,457

[22] Filed: Oct. 4, 1978

[51] Int. Cl.² .................. F16H 55/04; F16H 55/06
[52] U.S. Cl. .................. 74/437; 74/462; 368/107
[58] Field of Search .......... 74/437, 445, 462, 439; 58/7, 23 D, 28 D, 59, 125 B

[56] References Cited

U.S. PATENT DOCUMENTS

| | | | |
|---|---|---|---|
| 2,399,925 | 5/1946 | Hewlett, Jr. | 74/437 |
| 4,041,794 | 8/1977 | Belot et al. | 74/460 |
| 4,051,744 | 10/1977 | Oshima | 74/437 |
| 4,108,016 | 8/1978 | Muranishi | 74/437 |

FOREIGN PATENT DOCUMENTS 321237  6/1957  Sweden.
599485 11/1975  Sweden.

Primary Examiner—C. J. Husar
Assistant Examiner—Conrad Berman
Attorney, Agent, or Firm—Griffin, Branigan & Butler

[57] ABSTRACT

A gear train enables rotational drive in either sense of a driven member while preventing transmission of rotation in either sense from the driven to the driving member. Each member of the train comprises a pair of discs attached on their faces with each disc having asymmetric teeth on its periphery and each disc of the pair being a reflection about a diametral line of the other. The asymmetrics in each member of the train are different.

5 Claims, 5 Drawing Figures

GEAR TRAIN

BACKGROUND OF THE INVENTION

Machine designers when faced with the problem of motion transmission have come up with various ingenious solutions to the problem, particularly, where intermittent motion must be transmitted or where special requirements are laid upon the machine, as for instance, unidirectional motion transmission, or in the case of rotating machines, limitation to a single sense of rotation. Where gearing is employed, recourse may be had to specific tooth forms in order to obtain specific limitations. Thus, should one attempt to turn the ring gear 1 in Swiss Pat. No. 321,237 in a clockwise sense, butting will occur between the internal teeth thereon and the teeth on the satellite pinion 6 whereby the two are locked together. Rotation in the counter clockwise sense of ring gear 1 however is freely permitted this owing, of course, to the specific tooth form chosen.

Should rotational transmission be desired in either sense of rotation, recourse may be had to the well-known Maltese cross mechanism, otherwise known as the Geneva wheel. Many variants of this particular mechanism are known. Among others may be cited the several variations shown in Swiss Pat. No. 599, 485. In this case, the driven member as well as the driver may have asymmetric toothing arranged in two planes. Here the motion transmitted is converted from steady motion into step by step motion, and owing to the particular construction of the toothing and the arrangement in two planes thereof, locking occurs between each step. A specific utilization for such mechanism has been shown in conjunction with a calendar mechanism as employed in a timepiece such as a watch.

As already mentioned, the foregoing mechanism provides a conversion from a continuous rotational motion to a stepping motion. It will thus be unsuitable for application in the context of the present invention wherein the driving source may already be provided with a stepping motor. Thus, for instance, in the case of a quartz controlled timepiece utilizing a miniaturized stepping motor and a time display employing time indicating hands, it is desired that forces occurring in the mechanism through sudden changes of directional motion, as may be expected during normal wearing of the timepiece, will not be transmitted from the time display back through the various gearing to react on the stepping motor. Since, however, the stepping motor itself already provides a step by step motion, it is desired to eliminate such further step by step motion as might be impressed on the existing movement. Thus, the gear train, such as illustrated in Swiss Pat. No. 599,485 would not be suitable. Although the present invention provides asymmetric teeth occurring in two planes the basic difference is that in both driving and driven member the teeth in each plane are a reflection about a diametral line of the teeth occurring in the other plane. Owing to the differences in asymmetrics, locking, however, may be expected as in the case of the Swiss Pat. No. 599,485 should one attempt to transmit rotational motion from the normal driven member to the normal driving member.

SUMMARY OF THE INVENTION

The invention, accordingly, comprises a gear train in which rotation in either sense may be transmitted from a driving gear to a driven gear an transmission of rotation in either sense from the driven gear to the driving gear is blocked, wherein each gear comprises a pair of discs fastened together on their faces, each disc of each pair having asymmetric teeth on its periphery and being a reflection about a diametral line of the other disc of the pair, the juxtaposed teeth of each assembled pair appearing symmetric when the assembled pair is viewed in plan.

DETAILED DESCRIPTION OF THE INVENTION

Figure 1:
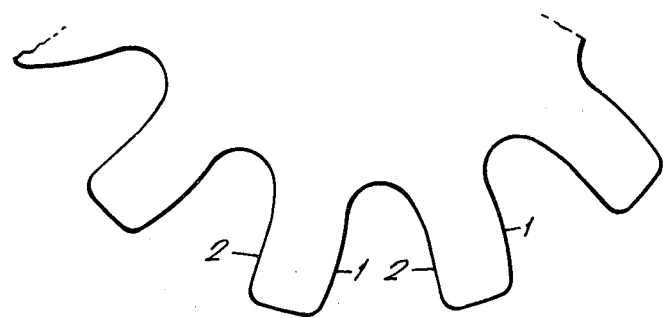
FIG. 1 shows the toothing in one disc of a driving member.
Figure 3:
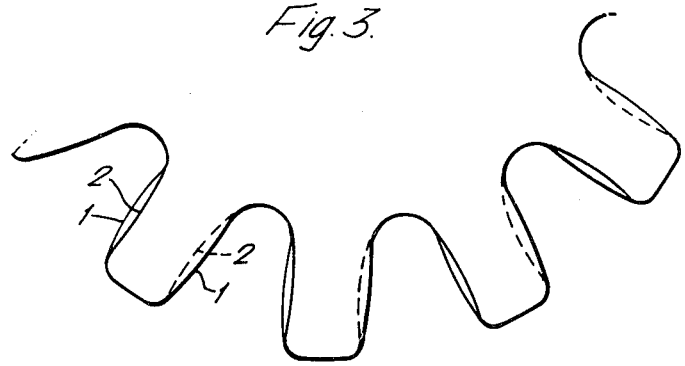
FIG. 3 shows a partial plan view of a driving member assembled from two discs having teeth cut as in FIG. 1.

A driving member such as shown in FIG. 3 is formed by fastening face to face a pair of members such as shown in FIG. 1 following reflection of one such member about a diametral line. The teeth are juxtaposed as shown particularly in FIG. 3. The tooth form as seen to best advantage in FIG. 1 comprises a convex rounded flank 1 and a concave rounded flank 2 opposite flank 1. By taking a pair of discs as in FIG. 1 and reflecting one such disc about a line passing through the diameter thereof thereafter fixing the two together as shown in FIG. 3 a driving gear in conformity with the invention may be obtained.

Figure 2:
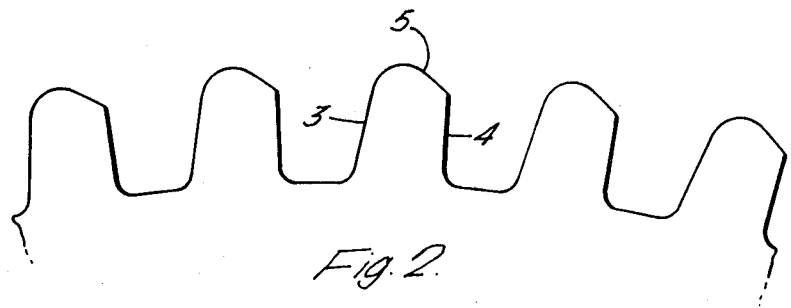
FIG. 2 shows the toothing in one disc of a driven member.

A similar consideration applies to the obtaining of the driven gear. In this case, however, the tooth forms, although asymmetric, are of a different assymetry to those of the driving gear. In this case, the flanks 3 and 4 (FIG. 2) are respectively straight lines. To the extent that conventional gearing terms may be applied to such unconventional tooth forms, portion 5 of the gear teeth, as shown in FIG. 2, may be considered as the face. This is rounded in asymmetric manner as shown whereby when the two discs forming the driven member are duly assembled the tooth form when viewed in plan resembles a rounded top isosceles trapezoid. When viewed in plan, the driving member, however, bears a considerable resemblance to a standard gear cut with ordinary involute teeth.

Figure 5:
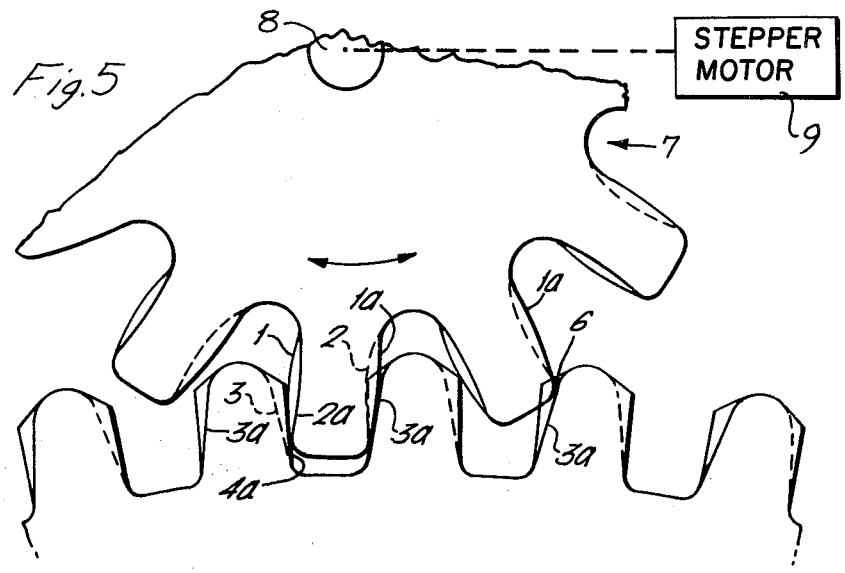
FIG. 5 is a plan view showing the meshing of teeth between the driving member and the driven member in accordance with this invention.
Figure 4:
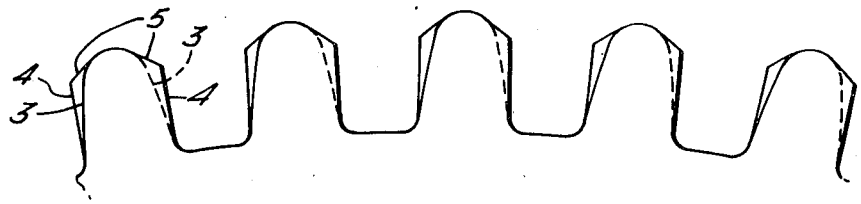
FIG. 4 is a plan view of a driven member formed from two discs having teeth cut as shown in FIG. 2.

FIG. 5 shows a driving gear 7, mounted for rotation with a shaft 8 that is driven by a stepper motor 9.

A study of FIG. 5 will readily show how this particular tooth arrangement achieves the object of the invention. Thus, rotation of the driving gear in the counter clockwise sense, will, as shown in FIG. 5, bring flank 1a of the teeth on the top disc into contact initially with flank 3a of the tooth on the top disc of the driven member. Should rotation be in the clockwise sense then in such case contact will be initially established between the flanks 1 and 3 of the respective tooth portions on the bottom disc. Should now an attempt be made to transmit motion from the normal driven member to the driving gear it will be found that butting occurs between the teeth as shown, for instance, at 6 in FIG. 5 in which the flank 3a of the top portion of the driven gear butts against a corner of the flank 1a on the normal driving gear. A similar butting phenomenon will occur should one attempt to transmit rotation in the opposite sense from the driven gear to the driving gear.

Although the description thus far has suggested or implied that the composite gears of the present invention might be formed by placing two disc portions face to face in a permanent manner, it is clear that other forms of manufacture might equally well be adopted and thus it is clearly within the scope of the invention that all such gearing might be produced by means of precision injection moulding techniques. This is particularly the case where gears are not required to carry large loads as, for instance, in timepieces and like small mechanisms.

What we claim is:

1. A gear train in which rotation in either sense may be transmitted from a driving gear to a driven gear and transmission of rotation in either sense from the driven gear to the driving gear is blocked, wherein each gear comprises a pair of discs fastened together on their faces, each disc of each pair having asymetric teeth on its periphery and being a reflection about a diametral line of the other disc of the pair, the juxtaposed teeth of each assembled pair appearing symmetric when the assembled pair is viewed in plan.

2. A gear train as set forth in claim 1 wherein the tooth flanks of the discs forming the driving gear are curved so that the teeth of the assembled driving gear resemble involute teeth when the assembled pair is viewed in plan.

3. A gear train as set forth in claim 1 wherein the tooth flanks of the discs forming the driven gear are straight so that the teeth of the assembled driven gear resemble a rounded top isosceles trapezoid when the assembled pair is viewed in plan.

4. A gear train as set forth in claim 1 wherein the driving gear is mounted on the shaft of a stepping motor whereby rotational movement from a subsequent mechanism is prevented from being communicated to said stepping motor.

5. A gear train as set forth in claim 4 wherein said stepping motor comprises a drive motor for a timepiece.

* * * * *